No. 896,508. PATENTED AUG. 18, 1908.
J. F. BADGER.
TIRE UPSETTER, PUNCH, AND SHEAR MACHINE.
APPLICATION FILED AUG. 21, 1907.

3 SHEETS—SHEET 1.

WITNESSES
L. H. Schmidt.
Edw. W. Byrn.

INVENTOR
JOHN F. BADGER.
BY Munn & Co.
ATTORNEYS.

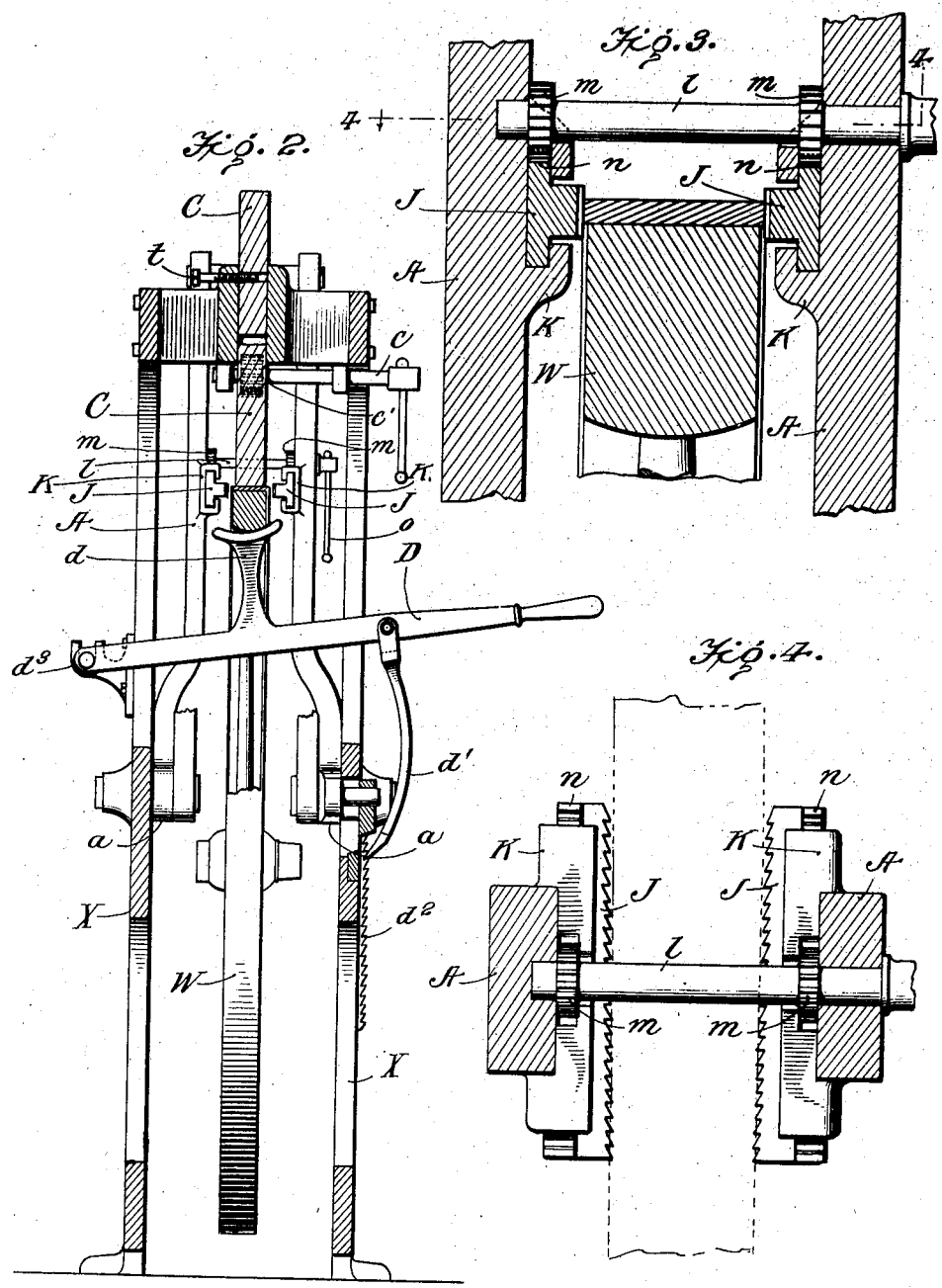

No. 896,508.   PATENTED AUG. 18, 1908.
J. F. BADGER.
TIRE UPSETTER, PUNCH, AND SHEAR MACHINE.
APPLICATION FILED AUG. 21, 1907.

3 SHEETS—SHEET 3.

WITNESSES
F. H. Schmidt.
Edw. W. Byrn.

INVENTOR
JOHN F. BADGER,
BY Munn & Co.
ATTORNEYS

UNITED STATES PATENT OFFICE.

JOHN FRED. BADGER, OF ST. LOUIS, MISSOURI.

TIRE-UPSETTER, PUNCH, AND SHEAR MACHINE.

No. 896,508.     Specification of Letters Patent.     Patented Aug. 18, 1908.

Application filed August 21, 1907. Serial No. 389,463.

*To all whom it may concern:*

Be it known that I, JOHN FRED. BADGER, a citizen of the United States, residing at St. Louis, in the State of Missouri, have invented a new and useful Improvement in Tire-Upsetter, Punch, and Shear Machines, of which the following is a specification.

The object of my invention is to provide a powerful and efficient tire upsetter for upsetting or shrinking tires on the wheels of vehicles, either hot or cold, and which also shall be capable of performing the work of shearing, punching, &c.

Figure 1:
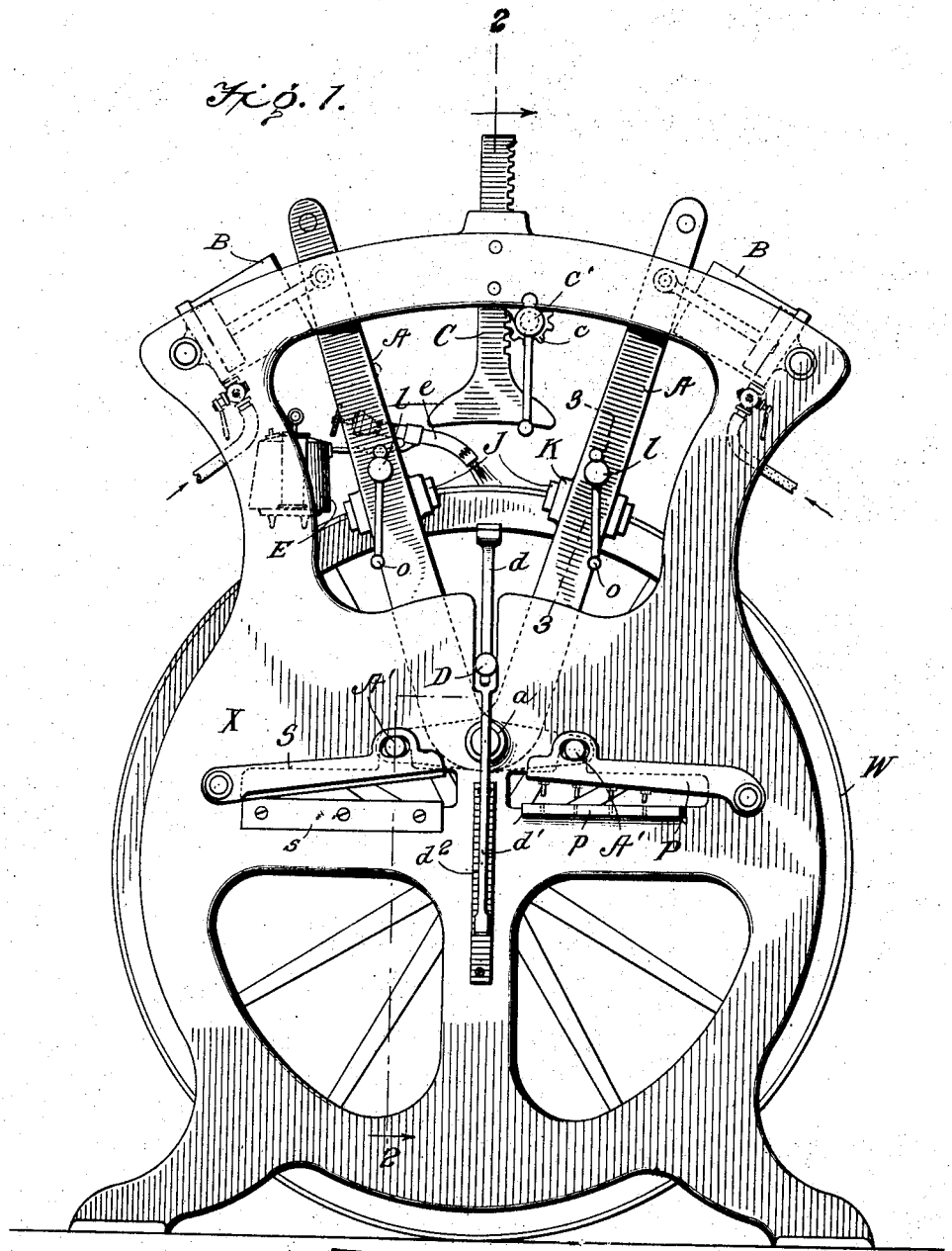
Figure 2:
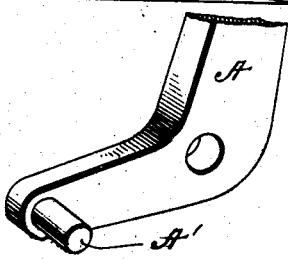
Figure 6:
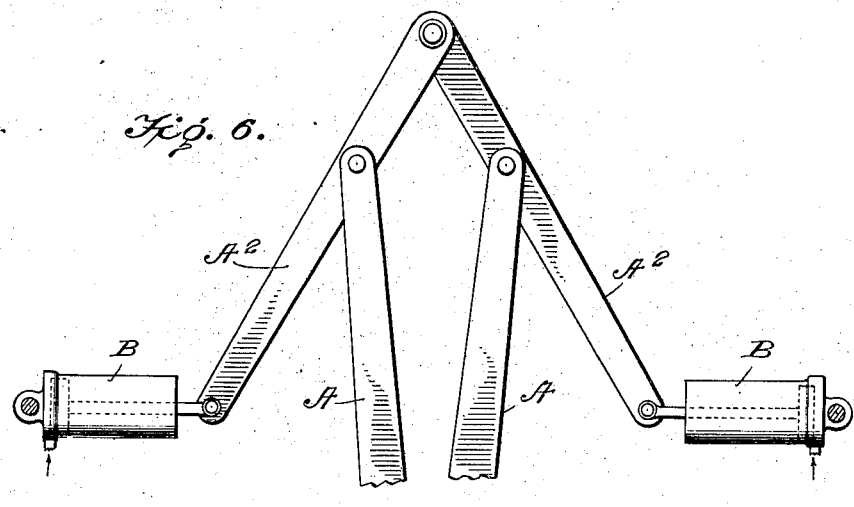
Figure 7:
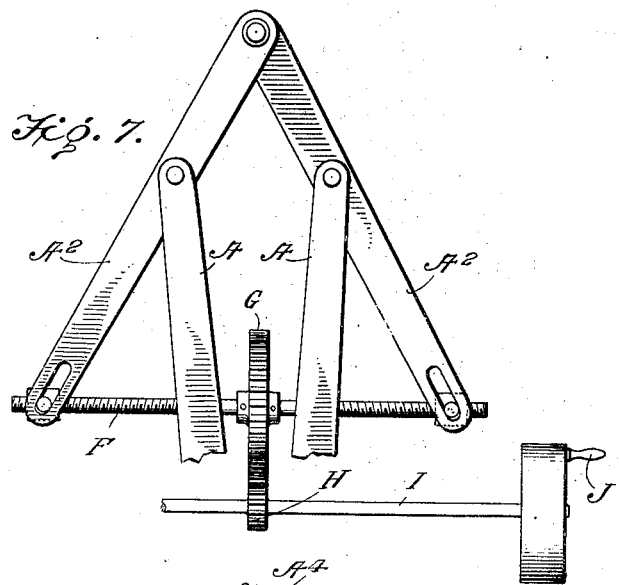
Figure 8:
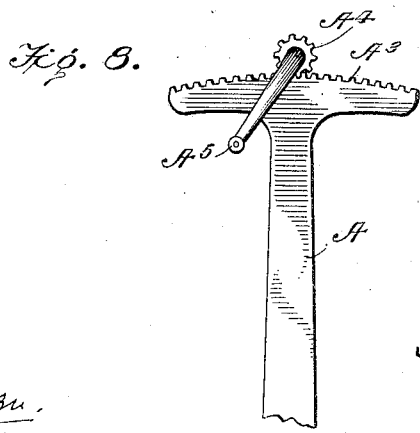

My invention consists in the novel construction and arrangement of the parts which I will now proceed to describe with reference to the drawings, in which Figure 1 is a front elevation of the entire machine. Fig. 2 is a vertical transverse section on line 2—2 of Fig. 1. Fig. 3 is an enlarged sectional view on line 3—3 of Fig. 1, showing the gripping jaws and the tire of the wheel engaged thereby. Fig. 4 is a section on line 4—4 of Fig. 3. Fig. 5 is a detail in perspective of the lower end of one of the main gripping levers, Figs. 6, 7 and 8 are details of modifications.

In the drawing, X represents the main frame consisting of two upright parallel and similarly shaped castings or plates connected together. At about the center of each plate is fulcrumed at $a$ a pair of gripping levers A A bearing gripping devices designed to seize and upset the tire of a wheel W when placed between the two plates of the main frame. There are four of these gripping levers, two on one side of the wheel, and two on the opposite side, the gripping devices of the levers on one side of the wheel coöperating with the gripping devices on the opposite side of the wheel to pinch and grip the tire between them preparatory to a movement toward each other to upset or shrink the tire.

The gripping levers extend upwardly to the top of the frame in divergent relation and at their upper ends are connected to the plungers of hydraulic jacks or ram cylinders B, so that when water oil or steam is forced into these cylinders the levers A A are brought together with a powerful action.

Each lever A, see Figs. 2, 3, 4, has on its inner side a transverse guideway K in which are arranged sliding gripping jaws J which have teeth on their inner edges adapted to grip the edge of the tire. These gripping jaws are of T-shape in cross section, as seen in Fig. 3, and have along their upper edges rack teeth $n$ adapted to be engaged by the pinions $m$ $m$ on a transverse shaft $l$, journaled in the opposite levers A A and having a turning crank arm $o$, Figs. 1 and 2, for adjusting the gripping jaws in their guides. The gripping jaws are of wedge shape, as seen in Fig. 4, so that the inward strain of the levers A and guide sockets in upsetting the tire, will wedge against the gripping jaws and jam the gripping jaws against the tire. To loosen and adjust the jaws, in applying them to, or removing their gripping contact with the tire, the shaft $l$ and pinions $m$ are rotated by the crank handle $o$.

The upper ends of the main frame plates are arched, as seen in Fig. 1, and at a point midway between the levers A A is supported an adjustable stop foot C whose lower edge is curved to correspond to the curve of the wheel and whose upper end is provided with rack teeth engaged by a pinion $c'$ on a transverse shaft $c$, provided with a crank arm for turning it. By turning this crank arm and shaft, the stop foot C may be adjusted down to solid contact with the tire, as seen in Fig. 2, or be elevated to a distance above the same, as seen in Fig. 1. The foot is to be rigidly held in either of these positions by means of a locking pin $t$.

To lift the wheel up to the gripping jaws, and also hold it against the foot C when the latter is down as in Fig. 2, a transverse lever D with a curved saddle $d$ is provided as seen in Fig. 2. This lever is projected through the wheel until a pin in its end is received into an open fulcrum seat $d^3$ and the lever is then raised to cause the saddle $d$ to lift the felly of the wheel to position and when in said position the position of the lever is fixed by a detent $d'$ which is pivoted to the lever and is made to engage one of a series of ratchet teeth $d^2$ on the frame plate.

My machine is designed to upset tires either cold or hot. Small tires may be upset cold, but when the tire is above a certain cross section it is necessary to soften the iron by heating. For this purpose a gasolene torch E is mounted upon a bracket inside the main frame and has its flame spout, or burner e, brought down close to the tire at a point between the gripping jaws. When the flame of this torch is applied to the tire, the foot C is first elevated, as seen in Fig. 1, and as soon as the texture of the iron has been sufficiently softened by heat the foot C is brought down solidly thereon and power applied to bring the two sets of levers and gripping jaws together to upset the tire, the buckling of the tire being prevented by the curved abutting face of the foot. The levers A A can be brought together at the same time or can operate separately according to the requirements of the wheel.

In conjunction with the upsetting function of my machine, I also provide means whereby the same machine may be made to perform various operations in metal working, such as shearing, riveting, punching &c. For this purpose the lower ends of one pair of levers A are extended beyond their fulcrums, as seen in Fig. 5, and provided with a stout laterally projecting pin A'. This pin plays through a slot in the frame plate and enters an elongated hole in a shear jaw S, Fig. 1, which coöperates with a stationary shear plate s arranged below the movable jaw C, so that when the machine is not in use for upsetting tires, the same organization of devices permits the movement of the levers to be utilized for shearing. In like manner, a lever P on the other side is provided with graduated punches adapted to coöperate with a perforated die plate p attached to the frame plate, and there may be two of these supplementary attachments on each of the main frame plates coöperating with the two main levers of each plate.

In making use of my invention where great power is required, I may interpose between the main levers and the hydraulic plunger a set of compounding levers as seen in Fig. 6, in which $A^2$ $A^2$ are the compounding levers connecting the jack plungers to the said levers, the said compounding levers being jointed to each other at the top to give a toggle effect.

If it is not desired to use a hydraulic pump or jack, but a purely mechanical means of operation, I may employ the construction shown in Fig. 7, in which the levers A and $A^2$ are brought together by a right and left screw extending through trunnion nuts in the lower slotted ends of levers $A^2$. On this double screw shaft is fixed a gear wheel G engaged by a pinion H on a shaft I, turned by a band wheel or crank J. Where but little power is required, the simple construction shown in Fig. 8 may be employed. In this case an arc-shaped tooth bar $A^3$ is formed on the upper ends of each of the gripping levers A which toothed bars are directly engaged by pinions $A^4$ on a shaft turned by the crank $A^5$.

In my machine it will be seen that the upsetting is done at the top of the wheel in position for easy inspection by the workman while standing beside the machine and in convenient position for manipulation. As each side plate X has an arch bar at the top connected by upright standards to the body of the plate, it will be seen that the point at which the upsetting operation is performed is entirely open for inspection and the manipulation of the torch and presser foot as well as of the gripping jaws, and the frame affords at the top a convenient means for supporting and holding the hydraulic cylinders or other power appliance. The machine is also a very economical one for the wheelwright, since it embodies the functions of several machines in one and taking up but little floor space.

In carrying out my invention it will be understood that many changes in the details of construction may be made without departing from my invention as set forth in the claims.

I claim—

1. A tire upsetting machine, comprising two upright frame plates with openings in their upper ends forming top and side bars, gripping levers fulcrumed at their lower ends to said plate below said openings, and projecting upwardly, gripping jaws carried by said levers intermediate their length and within the openings of the frame plates, power appliances connected to the upper ends of said levers, a vertically adjustable abutment foot supported in a guide carried by the top bars of the frame plates and arranged in the plane of the wheel between the gripping levers and above the gripping jaws, and means for raising and lowering and locking the foot in its two positions.

2. A tire upsetting machine, comprising two upright frame plates with openings in their upper ends forming top and side bars, gripping levers fulcrumed at their lower ends to said plates below said openings, and projecting upwardly, gripping jaws carried by said levers intermediate their length and within the openings of the frame plates, power appliances connected to the upper ends of said levers, a vertically adjustable abutment foot arranged in the plane of the wheel above the gripping jaws and between the gripping levers and in the open space of the frame plate, means for raising and lowering and locking the foot in its two positions, and a heating appliance connected to the main frame and having its burner extended to the central open space of the frame and arranged to direct its flame upon the tire beneath the foot.

3. A tire upsetting machine, comprising an upright frame, gripping levers fulcrumed at their lower ends to said frame and projecting upwardly, gripping jaws carried by said levers intermediate their length, power appliances connected to the upper ends of said levers, and a removable lever with lifting support for the wheel and means for locking it in elevated position.

4. In an upsetting machine, a gripping lever with transverse tapering guide socket, a tapering gripping jaw arranged therein and having rack teeth along one edge, a shaft with a pinion engaging said teeth on the gripping jaw and means for turning the shaft.

JOHN FRED. BADGER.

Witnesses:
BERT E. McDOW,
JAMES L. SECOR.